United States Patent
Satou

(10) Patent No.: US 9,703,496 B2
(45) Date of Patent: Jul. 11, 2017

(54) INFORMATION PROCESSING DEVICE, INFORMATION PROCESSING METHOD, AND MEDIUM

(71) Applicant: NEC Corporation, Minato-ku, Tokyo (JP)

(72) Inventor: Takuma Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/963,717

(22) Filed: Dec. 9, 2015

(65) Prior Publication Data
US 2016/0216900 A1 Jul. 28, 2016

(30) Foreign Application Priority Data

Jan. 27, 2015 (JP) ................................. 2015-013212

(51) Int. Cl.
*G06F 12/00* (2006.01)
*G06F 3/06* (2006.01)
*G06F 12/02* (2006.01)

(52) U.S. Cl.
CPC .......... *G06F 3/0616* (2013.01); *G06F 3/0638* (2013.01); *G06F 3/0673* (2013.01); *G06F 12/0246* (2013.01); *G06F 2212/7204* (2013.01); *G06F 2212/7205* (2013.01)

(58) Field of Classification Search
CPC .... G06F 3/0616; G06F 3/0638; G06F 3/0673; G06F 12/0246; G06F 2212/7204; G06F 2212/7205
See application file for complete search history.

(56) References Cited

U.S. PATENT DOCUMENTS

2014/0281168 A1* 9/2014 Koseki .................. G06F 11/108
711/103

FOREIGN PATENT DOCUMENTS

| JP | 2010-113600 A | 5/2010 |
| JP | 2010-244521 A | 10/2010 |
| JP | 2014-052899 A | 3/2014 |
| JP | 2014-203381 A | 10/2014 |

OTHER PUBLICATIONS

Japanese Office Action for JP Application No. 2015-013212 mailed on Mar. 29, 2016 with English Translation.

* cited by examiner

*Primary Examiner* — Shawn X Gu

(57) ABSTRACT

An information processing device according to the present invention includes: a solid state drive control unit that measures a quantity of write data to a solid state drive and an operation time of the solid state drive, and compresses write data; and a solid state drive support unit that determines whether or not the compression is required, on the basis of a life threshold value that is calculated on the basis of a life of the solid state derive and a total quantity of the write data to the solid state drive, and a life determination value that is calculated on the basis of the quantity of the write data and the operation time, and instructs the solid state drive control unit to compress the write data when the compression is required.

6 Claims, 4 Drawing Sheets

INFORMATION PROCESSING DEVICE, INFORMATION PROCESSING METHOD, AND MEDIUM

This application is based upon and claims the benefit of priority from Japanese Patent Application No. 2015-013212, filed on Jan. 27, 2015, the disclosure of which is incorporated herein in its entirety by reference.

TECHNICAL FIELD

The present invention relates to a solid state drive (SSD), and more particularly to an information processing device, an information processing method, and a medium, which manage the life of a solid state drive (SSD).

BACKGROUND ART

A Solid state drives (SSD) has a rewriting lifetime. Accordingly, techniques for managing the lifetime have been proposed (for example, see Japanese Laid-open Patent Publication No. 2014-203381 and Japanese Laid-open Patent Publication No. 2010-244521).

In addition, there is a throttling method for a method of extending a life. The SSD employing throttling controls the frequency of an input output (IO) operation in such a manner to suppress the frequency as the throttling when the SSD determines that a volume of write data is large and the life is shortened.

SUMMARY

An object of the present invention is to provide an information processing device, an information processing method, and a medium, which extend the life of an SSD without using throttling or the like.

An information processing device according to an exemplary aspect of the invention includes: a solid state drive control unit that measures a quantity of write data to a solid state drive and an operation time of the solid state drive, and compresses write data; and a solid state drive support unit that determines whether or not the compression is required, on the basis of a life threshold value that is calculated on the basis of a life of the solid state derive and a total quantity of the write data to the solid state drive, and a life determination value that is calculated on the basis of the quantity of the write data and the operation time, and instructs the solid state drive control unit to compress the write data when the compression is required.

An information processing method according to an exemplary aspect of the invention includes: measuring a quantity of write data to a solid state drive and an operation time of the solid state drive; determining whether or not compression is required on the basis of a life threshold value that is calculated on the basis of a life of the solid state derive and a total quantity of the write data to the solid state drive and a life determination value that is calculated on the basis of the quantity of the write data and the operation time; and compressing the write data when the compression is required.

A computer readable non-transitory medium according to an exemplary aspect of the invention embodying a program, the program causing a processing device to perform a method, the method includes: measuring a quantity of write data to a solid state drive and an operation time of the solid state drive; determining whether or not compression is required on the basis of a life threshold value that is calculated on the basis of a life of the solid state drive and a total quantity of the write data to the solid state drive and a life determination value that is calculated on the basis of the quantity of the write data and the operation time; and compressing the write data when the compression is required.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
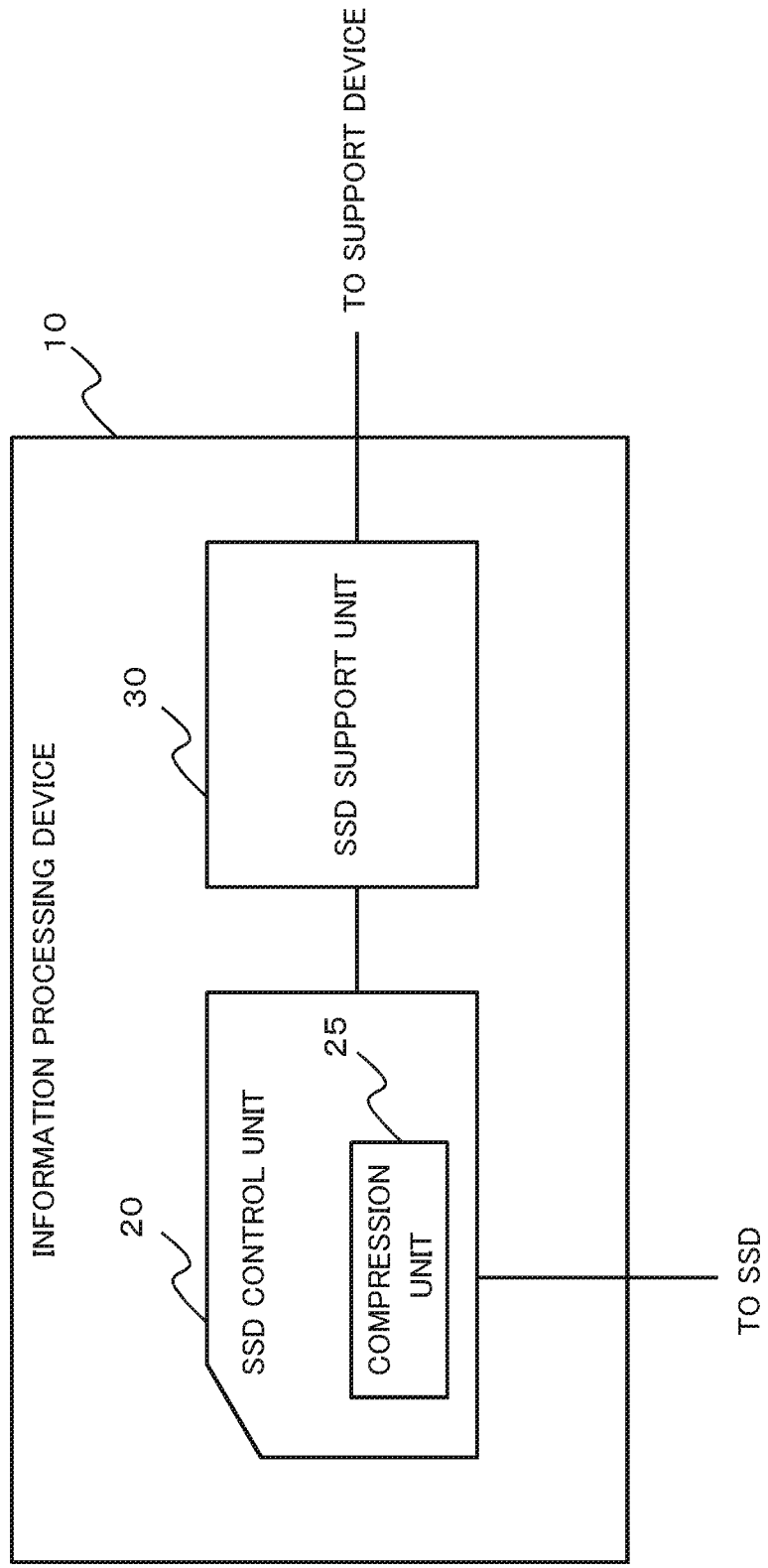
FIG. 1 is a block diagram illustrating an example of a configuration of an information processing device according to a first exemplary embodiment of the present invention.

An exemplary embodiment of the present invention will be described in detail below with reference to the accompanying drawings.

Each of the drawings is for illustrative purposes of the exemplary embodiment of the present invention. However, the present invention is not limited to the illustration of each drawing. In addition, the same numerals are appended to the same or similar elements in each of the drawings, and repeated description thereof may be omitted.

Further, in the drawings used for the below description, configurations of components unrelated to the description of the present invention may be omitted, and illustration thereof may be omitted.

First Exemplary Embodiment

First, to describe an information processing device 10 according to a first exemplary embodiment of the present invention, an example of an information processing system 90 including the information processing device 10 will be described.

Figure 3:
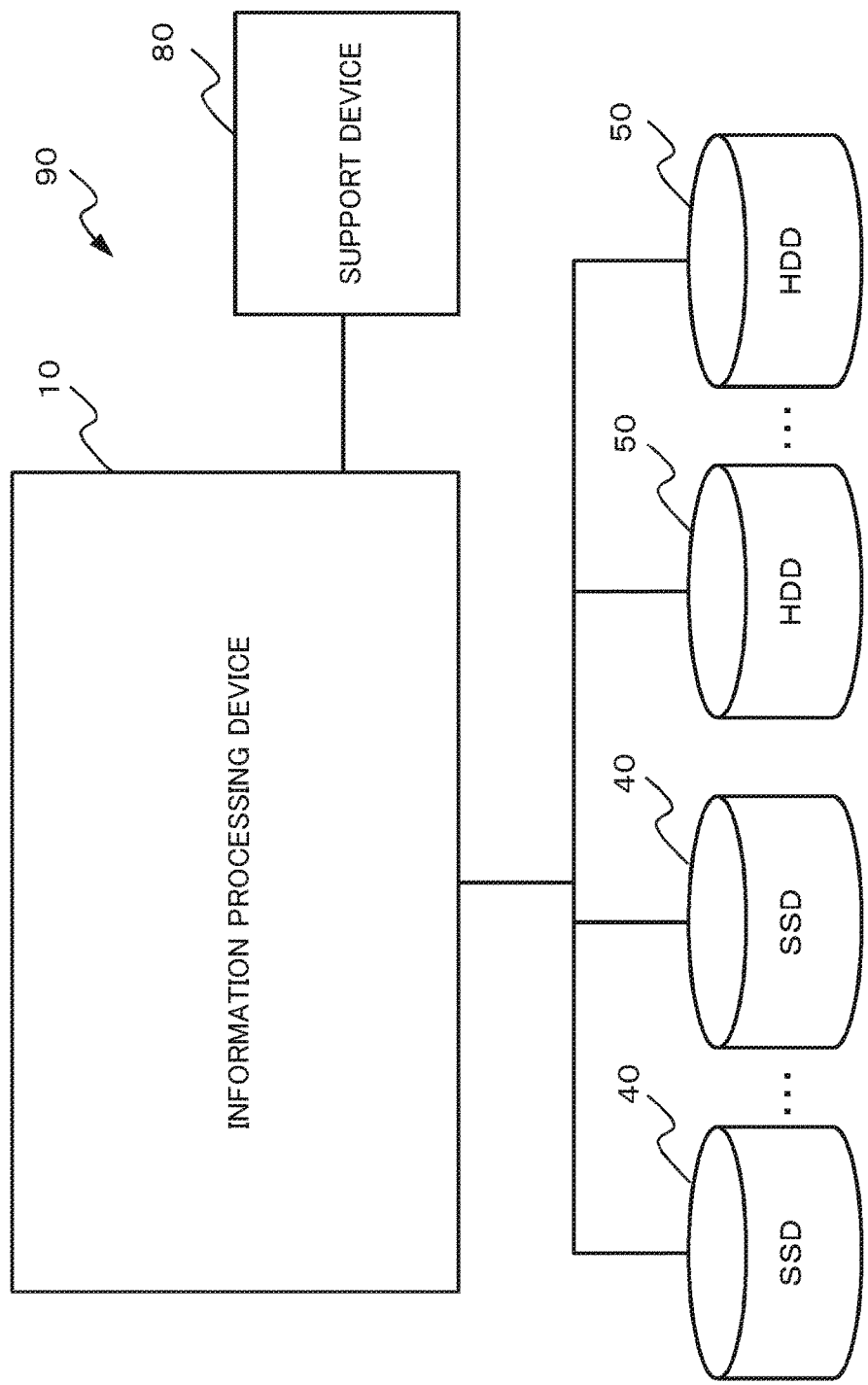
FIG. 3 is a block diagram illustrating an example of a configuration of an information processing system including the information processing device according to the first exemplary embodiment.

FIG. 3 is a block diagram illustrating an example of a configuration of the information processing system 90 including the information processing device 10 according to the first exemplary embodiment.

The information processing system 90 includes the information processing device 10, one or a plurality of SSDs 40, and a support device 80.

Each of the SSDs 40 operates as a storage device, stores received data, and outputs stored data in response to a request. Each SSD 40 may be a typical SSD and detailed description thereof is thus omitted.

The support device 80 is connected to the information processing device 10, transmits information (e.g., an instruction) to the information processing device 10, and receives information (e.g., a state of the SSD 40) from the information processing device 10. The support device 80 may display received information.

The information processing device 10 is connected to the one or the plurality of SSDs 40 and executes data writing to the SSDs 40 and data reading from the SSDs 40. The information processing device 10 may be connected to one or a plurality of storage devices other than the SSD 40 (for example, a hard disk drive (HDD) 50 as illustrated in FIG. 3).

The information processing device 10 may include the SSDs 40 (and an HDD 50) in the interior thereof.

Next, a configuration of the information processing device 10 according to the first exemplary embodiment of the present invention will be described.

FIG. 1 is a block diagram illustrating an example of the configuration of the information processing device 10 according to the first exemplary embodiment.

With reference to FIG. 1, the information processing device 10 includes an SSD control unit 20 and an SSD support unit 30. Furthermore, the SSD control unit 20 includes a compression unit 25.

The information processing device 10 determines the life of the SSD 40 on the basis of these configurations. Further, when determining that the SSD 40 may have a shortened life (for example, when a write data volume (a quantity of the write data) is large), the information processing device 10 compresses write data, reduces a write data volume written to the SSD 40, and achieves a life extension of the SSD 40.

Next, each of the configurations will be described in more detail.

As the premise, it is supposed that the SSD 40 stores in advance a life parameter (a life year (X)) that indicates a life and a total write data volume (a total quantity of the write data) (W) until the end of the life. For example, typically, the SSD 40 is made to store the life parameter when shipped from the factory. When the SSD 40 fails to store the life parameter, the SSD control unit 20 may acquire the life parameter of the SSD 40 from an unillustrated management device or the like. In such a case, the SSD control unit 20 may operate in such a manner as to replace an operation of acquisition of the life parameter from the SSD 40 as described below with an operation of acquisition from such a device. In addition, the life parameter is not limited to the life year (X) and the total write data volume (W) until the end of the life. The life parameter should be data that can be used for determining the life of the SSD 40 by the SSD support unit 30 as described below.

The SSD control unit 20 controls an access to the SSD 40. Specifically, the SSD control unit 20 controls data writing and data reading. Then, the SSD control unit 20 measures (counts) a write data volume (Y) to the SSD 40. Further, the SSD control unit 20 measures an operation time (Z) of the SSD 40.

The compression unit 25 is controlled by the SSD control unit 20 and compresses data written by the SSD control unit 20 to the SSD 40.

When a compression ratio of the data in the compression unit 25 is high, a data volume written to the SSD 40 is small. However, when the compression ratio is high, a process for the compression in the compression unit 25 is large and an access performance lowers. Accordingly, the compression in the compression unit 25 is desirably performed at a required minimum compression ratio.

Furthermore, the compression unit 25 is desirably provided with compression ratios of a plurality of data (data compression levels).

The SSD support unit 30 acquires the write data volume (Y) and the operation time (Z) until the present time and the life parameter of the SSD 40 from the SSD control unit 20.

Then, the SSD support unit 30 calculates, on the basis of the write data volume (Y), the operation time (Z), and the life parameter, a life threshold value that is used for determining whether or not the compression is required and a value that is compared with the life threshold value (a life determination value). Then, the SSD support unit 30 determines, on the basis of the life threshold value and the life determination value, whether or not the compression in the SSD control unit 20 is required. The life threshold value and the life determination value will be described later in detail.

When the compression unit 25 is provided with a plurality of data compression levels, the SSD support unit 30 may select a data compression level in the compression unit 25.

Then, when the SSD support unit 30 has determined that the compression is required, the SSD support unit 30 instructs the SSD control unit 20 to compress data. Further, when a data compression level has been selected, the SSD support unit 30 notifies the data compression level to the SSD control unit 20.

The SSD control unit 20 compresses write data by using the compression unit 25 on the basis of the instruction of the compression (and the data compression level) from the SSD support unit 30, and then writes data to the SSD 40.

The SSD support unit 30 may notify the presence or absence of an execution of the compression by the SSD control unit 20 and/or the data compression level to an external device, such as the support device 80 as illustrated in FIG. 3.

Next, an operation of the information processing device 10 will be described with reference to the accompanying drawings.

Figure 2:
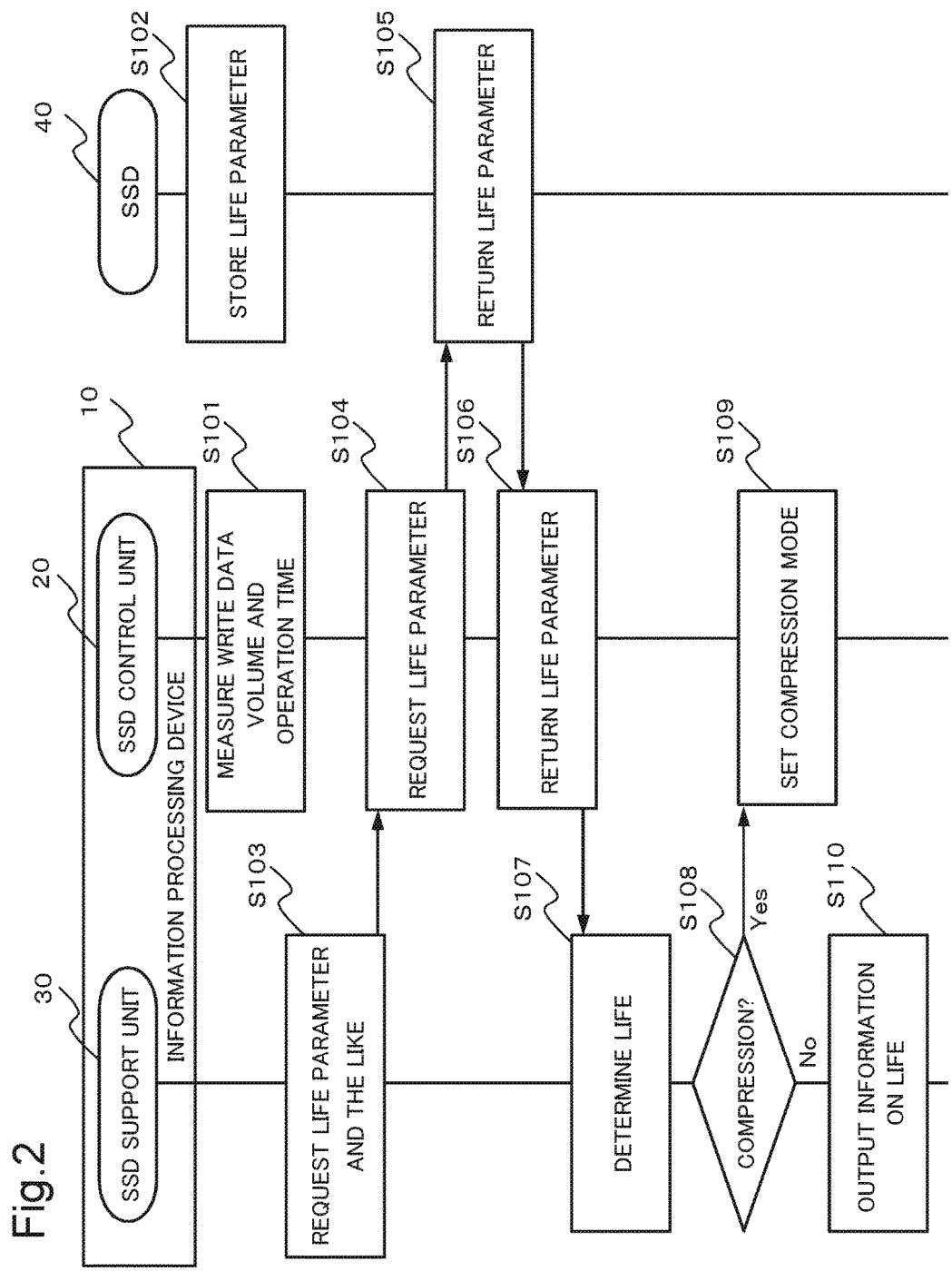
FIG. 2 is a sequence diagram illustrating an example of an operation of the information processing device according to the first exemplary embodiment.

FIG. 2 is a sequence diagram illustrating an example of the operation of the information processing device 10.

The SSD 40 in advance stores a life parameter (S102).

The SSD control unit 20 measures the write data volume (Y) to the SSD 40 and the operation time (Z) of the SSD 40 (S101). Prior to the measurement, the SSD control unit 20 may determine whether or not a connected device is the SSD 40. For example, with reference to a rotational speed parameter of the connected device, the SSD control unit 20 may determine the connected device as the SSD 40 when the rotational speed amounts to "0."

The SSD support unit 30 requests information for determining a life (the life parameter and the like) from the SSD control unit 20 at a predetermined timing (for example, at a predetermined period or at the time of receiving a request from the support device 80) (S103). This information contains, in addition to the life parameter of the SSD 40, the write data volume (Y) and the operation time (Z) that are measured by the SSD control unit 20.

The SSD control unit 20 requests, on the basis of the request from the SSD support unit 30, the life parameter (the total write data volume (W) and the life year (X)) from the SSD 40 (S104). When the SSD control unit 20 has already received the life parameter (for example, when the life parameter has been received during an initialization process of the SSD 40), this processing may be omitted.

The SSD 40 transmits the life parameter to the SSD control unit 20 (S105).

The SSD control unit 20 transmits the life parameter that has been received and the write data volume (Y) and the operation time (Z) that have been measured to the SSD support unit 30 (S106).

The SSD support unit 30 calculates a life threshold value on the basis of the received information and determines a state of the life of the SSD 40 (e.g., a magnitude comparison between estimated time of the end of the life and the life threshold value) (S107).

Then, based on the determination, the SSD support unit 30 determines whether or not an execution of the compression by the SSD control unit 20 is required, and a data compression level (a data compression ratio) (S108).

When the compression is required (Yes in S108), the SSD support unit 30 instructs the SSD control unit 20 to compress data. Then, when the compression unit 25 corresponds to a plurality of data compression levels (data compression ratios), the SSD support unit 30 instructs the SSD control unit 20 about a data compression level.

When the compression has been already instructed, the SSD support unit 30 may omit the instruction to the SSD control unit 20. However, when the data compression level is changed even after the compression has been instructed, the SSD support unit 30 instructs the SSD control unit 20 to change the data compression level.

When instructed by the SSD support unit 30 to compress data, the SSD control unit 20 compresses write data to the SSD 40 by using the compression unit 25 (S109). Further, when receiving the data compression level, the SSD control unit 20 sets the data compression level for the compression unit 25. Then, the SSD control unit 20 compresses write data thereafter by using the compression unit 25 and then writes the compressed date to the SSD 40. As a result, the information processing device 10 reduces a write data volume written to the SSD 40 and achieves a life extension of the SSD 40.

When the compression is unrequired (No in S108), the SSD support unit 30 provides no instruction to the SSD control unit 20. When the compression has been already instructed, the SSD support unit 30 may instruct the SSD control unit 20 to stop the compression.

The SSD support unit 30 desirably stores a determination result after the determination. Further, the SSD support unit 30 desirably stores a determination result together with time information as a log.

Furthermore, the SSD support unit 30 may display the stored information as life information of the SSD 40 on an unillustrated display device, or transmit (output) the information to an external device (e.g., the support device 80) (S110). For example, the SSD support unit 30 may display the life information on an unillustrated display device until an execution of a next confirmation of the life.

[Description of Determination]

Next, a specific example of determining the life of the SSD 40 in the SSD support unit 30 in S108 will be described.

First, variables used for the description are summarized as follows:

W: a total write data volume in the SSD 40 until the end of the life (which is stored in the SSD 40);

X: the life year of the SSD 40 (which is stored in the SSD 40);

Y: a write data volume to the SSD 40 until the present time (which is measured by the SSD control unit 20); and Z: an operation time of the SSD 40 until the present time (which is measured by the SSD control unit 20).

The SSD support unit 30 employs "W/X" as a life threshold value. In addition, the SSD support unit 30 employs "Y/Z" as a value that is compared with the life threshold value (a life determination value). The life determination value corresponds to estimated time of the end of the life. However, in the comparison, the SSD support unit 30 executes, as appropriate, a conversion process, such as replacing the life year with data per unit time.

Then, the compression unit 25 is capable of compression at three data compression levels (data compression ratios) described as follows:

(1) data compression level 1: a low compression ratio (short process time);

(2) data compression level 2: an intermediate compression ratio (intermediate process time); and (3) data compression level 3: a high compression ratio (long process time).

In this case, the SSD support unit 30 executes a determination as described below, for example, and transmits an instruction to the SSD control unit 20:

(1) when the condition of "the life determination value (Y/Z)/the life threshold value (W/X)≤1.0" is satisfied, the SSD support unit 30 determines that the compression is unrequired;

(2) when the condition of "1.0<the life determination value (Y/Z)/the life threshold value (W/X)≤1.2" is satisfied, the SSD support unit 30 instructs the SSD control unit 20 about the compression level 1 (low compression);

(3) when the condition of "1.2<the life determination value (Y/Z)/the life threshold value (W/X)≤1.4" is satisfied, the SSD support unit 30 instructs the SSD control unit 20 about the compression level 2 (intermediate compression); and (4) when the condition of "1.4<the life determination value (Y/Z)/the life threshold value (W/X)" is satisfied, the SSD support unit 30 instructs the SSD control unit 20 about the compression level 3 (high compression).

In this manner, the SSD support unit 30 sets whether or not the compression is required and the degree of the compression on the basis of the magnitude of the life determination value relative to the life threshold value.

Next, effects of the present exemplary embodiment will be described.

The information processing device 10 according to the present exemplary embodiment can take an effect of achieving a life extension of the SSD 40.

Reasons for this are as follows.

The SSD control unit 20 measures a write data volume to the SSD 40 and an operation time of the SSD 40. Then, the SSD support unit 30 determines the life of the SSD 40 on the basis of a comparison between a life determination value that is calculated by using the write data volume and the operation time and a life threshold value that is calculated based on a life year and a total write data volume of the SSD 40. Then, the SSD support unit 30 determines predetermined compression on the basis of the determination result. Then, the SSD control unit 20 writes, by using the compression unit 25, data that has been compressed at a compression ratio of the determination result to the SSD 40. Accordingly, the information processing device 10 can achieve a life extension of the SSD 40 when data to be written is large.

In addition, the typical SSD 40 performs a management until the end of the life in the interior of the SSD 40. Moreover, methods of managing the life in the interior of the SSD 40 and parameters published as remaining life by the SSD 40 differ from each other for vendors and types. Accordingly, when the SSD 40 is used, a management method that can be uniformly applied has been unavailable.

On the other hand, the information processing device 10 according to the present exemplary embodiment manages the SSD 40 by using the write data volume from the information processing device 10 to the SSD 40 and the operation time in which the SSD 40 operates while connected to the information processing device 10. In addition, the information processing device 10 uses the life time and the total write data volume of the SSD 40 as a life parameter of the SSD 40. The life time and the total write data volume of the SSD 40 are a parameter common to each SSD 40. Accordingly, the information processing device 10 can take an effect of uniformly managing each SSD 40.

Modified Example

The information processing device 10 as described above is configured in the following manners.

For example, in the information processing device 10, each of component units may be configured by a hardware circuit. For example, the compression unit 25 that affects a performance when the compression is carried out is desirably configured by a hardware circuit.

Alternatively, in the information processing device 10, each of component units may be configured by using a plurality of devices that are connected to one another via a network.

Furthermore, in the information processing device 10, a plurality of component units may be configured by a single hardware.

The information processing device 10 may be achieved as a computer including a central processing unit (CPU), a read only memory (ROM), and a random access memory (RAM). The information processing device 10 may be achieved as a computer further including an input output circuit (IOC) and a network interface circuit (NIC) in addition to the above components.

Figure 4:
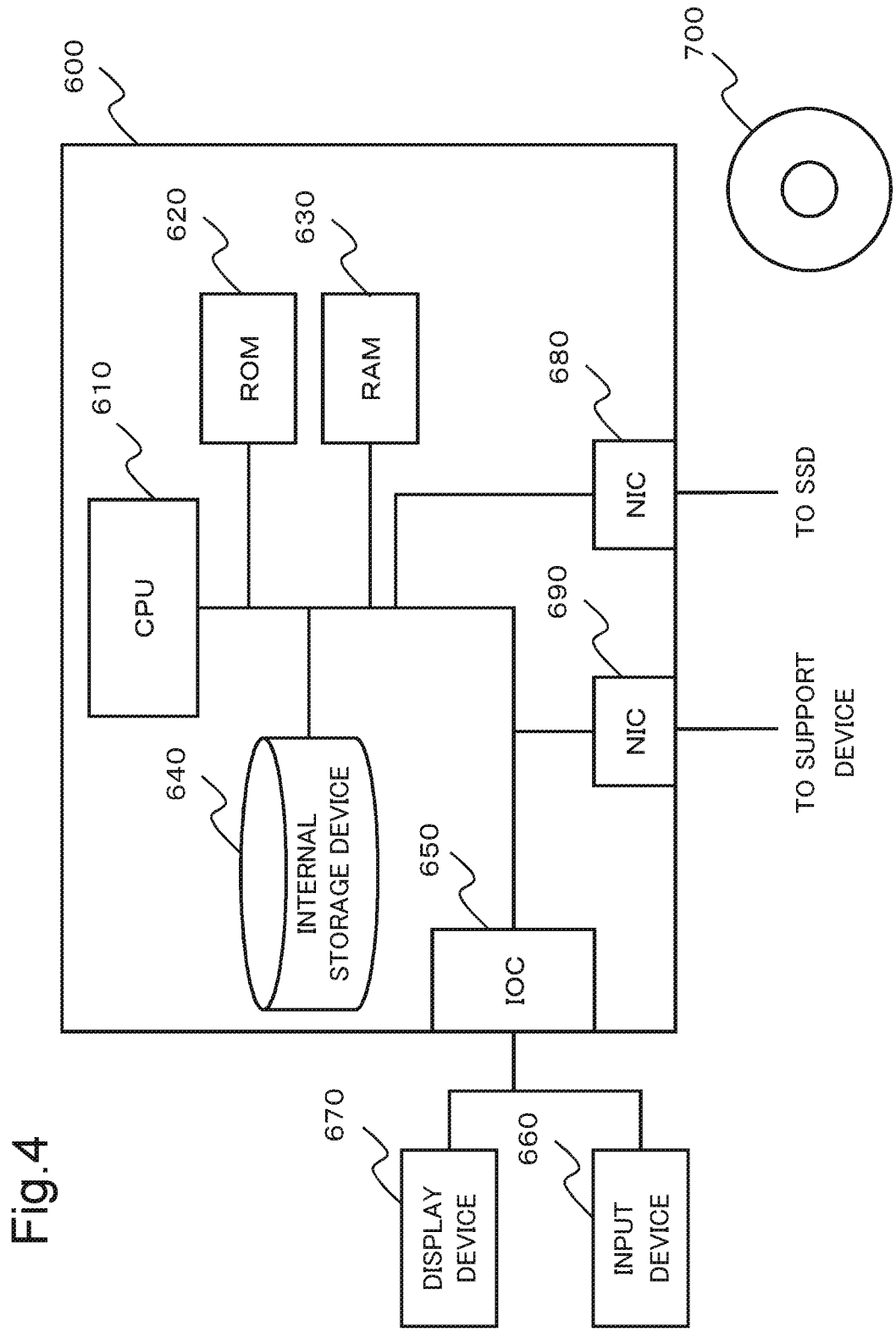
FIG. 4 is a block diagram illustrating an example of another configuration of the information processing device according to the first exemplary embodiment.

FIG. 4 is a block diagram illustrating an example of a configuration of an information processing device 600 according to the present variant.

The information processing device 600 includes a CPU 610, a ROM 620, a RAM 630, an internal storage device 640, an IOC 650, an NIC 680, and an NIC 690, thus constituting a computer.

The CPU 610 retrieves a program from the ROM 620. Then the CPU 610 controls the RAM 630, the internal storage device 640, the IOC 650, the NIC 680, and the NIC 690 on the basis of the retrieved program. Then, the computer including the CPU 610 controls these components and achieves each function as the SSD control unit 20 and the SSD support unit 30 as illustrated in FIG. 1.

When the CPU 610 achieves each function, the CPU 610 may use the RAM 630 or the internal storage device 640 as a temporary storage of programs.

Alternatively, the CPU 610 may retrieve a program contained in a storage medium 700, which stores the program so that it can be read by the computer, by using an unillustrated storage medium reading device. Alternatively, the CPU 610 may receive a program from an unillustrated external device via the NIC 680 or the NIC 690, store the program in the RAM 630, and operate based on the stored program.

The ROM 620 stores a program executed by the CPU 610 and fixed data. The ROM 620 is, for example, a programmable-ROM (P-ROM) or a flash ROM.

The RAM 630 temporarily stores a program executed by the CPU 610 and data. The RAM 630 is, for example, a dynamic-RAM (D-RAM).

The internal storage device 640 stores data and a program which are stored on a long-term in the information processing device 600. The internal storage device 640 may operate as a temporal storage device for the CPU 610. The internal storage device 640 is, for example, a hard disk device, a magneto optical disk device, an SSD, or a disk array apparatus.

The ROM 620 and the internal storage device 640 are non-transitory recording media. On the other hand, the RAM 630 is a transitory recording medium. Furthermore, the CPU 610 is operable on the basis of programs stored in the ROM 620, the internal storage device 640, or the RAM 630. In other words, the CPU 610 is operable using a non-transitory storage medium or a transitory storage medium.

The IOC 650 mediates data between the CPU 610 and an input device 660 and between the CPU 610 and a display device 670. The IOC 650 is, for example, an IO interface card or a universal serial bus (USB) card.

The input device 660 is a device that receives an input instruction from an operator of the information processing device 600. The input device 660 is, for example, a keyboard, a mouse, or a touch panel.

The display device 670 is a device that displays information to the operator of the information processing device 600. The display device 670 is, for example, a liquid crystal display.

The NIC 680 and the NIC 690 relay data exchanged with an unillustrated external device (e.g., the SSD 40 and the support device 80) via a network. The NIC 680 and the NIC 690 are, for example, a peripheral component interconnect express (PCIe) card or a local area network (LAN) card.

The information processing device 600 as configured in this manner can take effects similar to those of the information processing device 10.

This is because the CPU 610 of the information processing device 600 can achieve functions similar to those of the information processing device 10 on the basis of the program.

The present invention is applicable to a device using a storage device having a low endurance, such as an SSD.

For example, the present invention is applicable, as at least a part of a storage device, to a disk array device using an SSD and a redundant array of inexpensive (independent) disk (RAID) device.

The life of an SSD is specified by a write data volume. In other words, when a write data volume reaches a specified volume, a possibility of a failure in an SSD increases.

Recently, in a SSD, to enlarge the capacity, a manufacturing process of a negative-AND (NAND) gate constituting a SSD is miniaturized. In connection with the miniaturization, a capacity of holding charge at the NAND gate has decreased. Accordingly, in SSDs, a life has become shorter and shorter. Thus, a technique for a life extension of SSDs has been desired.

A technique described in Japanese Laid-open Patent Publication No. 2014-203381 is a technique using another memory. The technique is not a technique extending a life of an individual SSD. A technique described in Japanese Laid-open Patent Publication No. 2010-244521 is a technique calculating a life. The technique is not a technique extending a life of SSDs.

Consequently, there has been a problem, in the techniques described in Japanese Laid-open Patent Publication No. 2014-203381 and Japanese Laid-open Patent Publication No. 2010-244521, in that a life extension of an SSD itself cannot be carried out.

In addition, throttling is not a technique of a life extension of SSDs relative to a write data volume. Further, throttling is a method for lengthening an interval of an IO process. Accordingly, throttling decreases an IO performance. In other words, there has been a problem in throttling in decreasing a performance of SSDs. In addition, an execution of throttling in the interior of SSDs is unrecognizable from the exterior of SSDs. In other words, there has been a problem in throttling in that whether or not throttling is executed is unrecognizable from the exterior.

On the basis of the present invention, an effect of a life extension of SSDs can be taken.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

The invention claimed is:

1. An information processing device comprising:
a solid state drive control unit that measures a quantity of write data written to a solid state drive and an operation time of the solid state drive, and compresses the write data; and
a solid state drive support unit that determines whether or not the compression is required, on the basis of a life threshold value that is calculated on the basis of a life of the solid state drive and a total quantity of write data to be written to the solid state drive, and a life determination value that is calculated on the basis of the quantity of the write data and the operation time, and instructs the solid state drive control unit to compress the write data when the compression is required.

2. The information processing device according to claim 1, wherein
the solid state drive control unit has a plurality of data compression levels, each of which has a different compression ratio from each other as the compression level, and
the solid state drive support unit selects one of the data compression levels on the basis of the life threshold value and the life determination value, and instructs the solid state control unit to use the selected data compression level.

3. The information processing device according to claim 1, wherein
the solid state drive control unit acquires the life and the total quantity of write data from the solid state drive on the basis of a request from the solid state drive support unit.

4. The information processing device according to claim 1, wherein
the solid state drive support unit outputs a result of the determination.

5. An information processing method for an information processing device, the method comprising:
measuring a quantity of write data written to a solid state drive and an operation time of the solid state drive;
determining whether or not compression is required on the basis of a life threshold value that is calculated on the basis of a life of the solid state drive and a total quantity of write data to be written to the solid state drive and a life determination value that is calculated on the basis of the quantity of the write data and the operation time; and
compressing the write data when the compression is required.

6. A computer readable non-transitory medium embodying a program, the program causing an information processing device to perform a method, the method comprising:
measuring a quantity of write data written to a solid state drive and an operation time of the solid state drive;
determining whether or not compression is required on the basis of a life threshold value that is calculated on the basis of a life of the solid state drive and a total quantity of write data to be written to the solid state drive and a life determination value that is calculated on the basis of the quantity of the write data and the operation time; and
compressing the write data when the compression is required.

* * * * *